July 19, 1932.  W. R. MEYERS  1,867,857
MECHANISM AND METHOD FOR MAKING CANS
Filed June 23, 1928
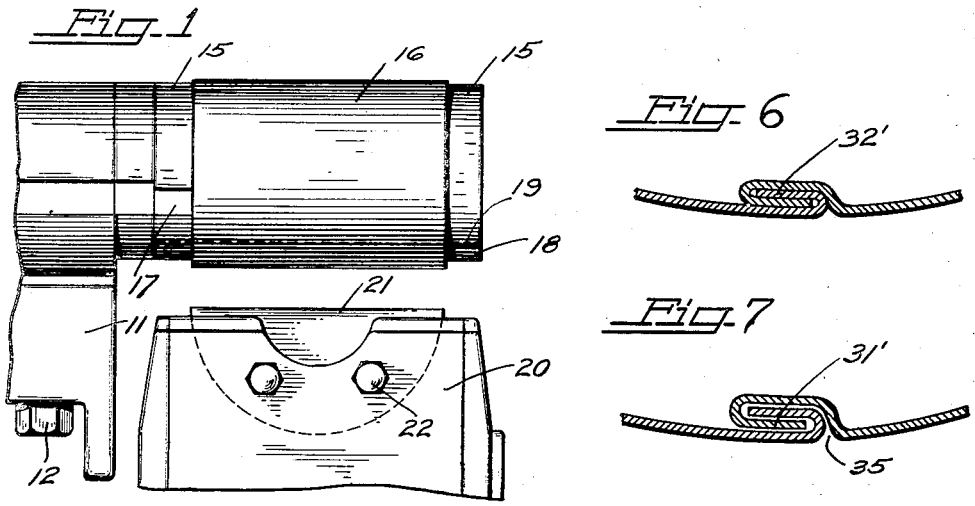
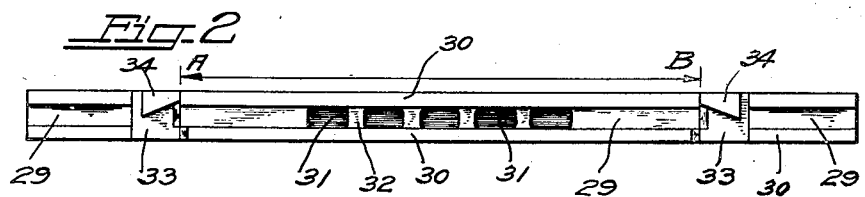
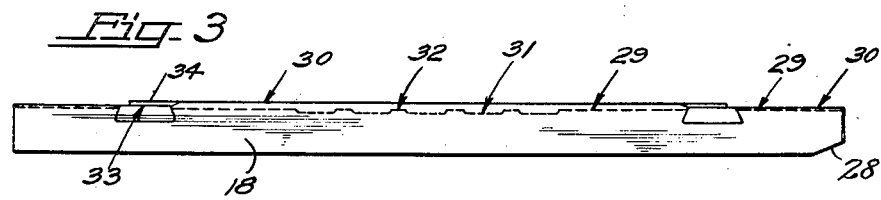
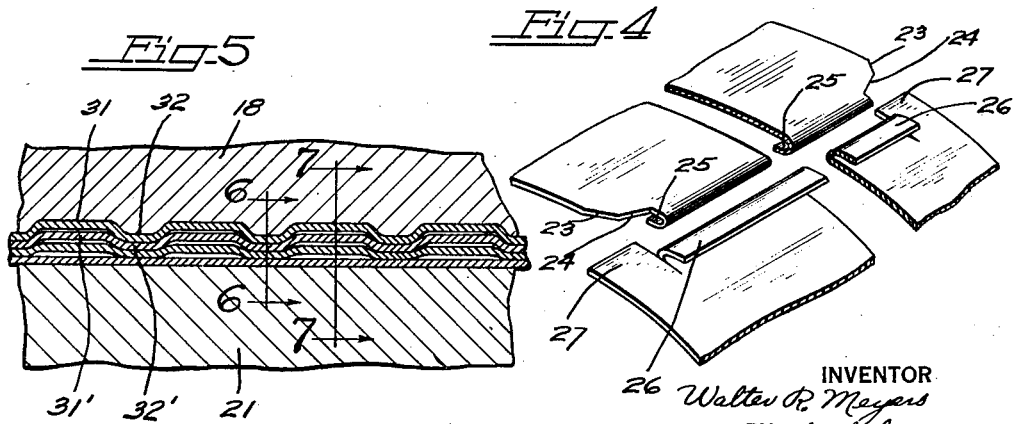
INVENTOR
Walter R. Meyers
BY John C. Carpenter
ATTORNEY Patented July 19, 1932

1,867,857

UNITED STATES PATENT OFFICE

WALTER R. MEYERS, OF BALTIMORE, MARYLAND, ASSIGNOR TO AMERICAN CAN COMPANY, OF NEW YORK, N. Y., A CORPORATION OF NEW JERSEY

MECHANISM AND METHOD FOR MAKING CANS

Application filed June 23, 1928. Serial No. 287,859.

My invention relates in general to the art of can making and has more particular reference to an improved mechanism and method for forming the side seams of container bodies.

Those familiar with the can making art know that within the last ten years automatic machines for making cans have been redesigned, refined and rebuilt until their speed of production has been doubled and trebled. This increased speed of automatic machinery has not been attained without certain attending difficulties. For instance, in the case of the modern bodymaker and the side seam soldering unit connected therewith, it has been found that when molten solder is rapidly applied to the side seam of the can body by means of the well-known solder roller, air is trapped within the side seam, which air, owing to the enormous heat of the solder bath, expands and prevents the solder from filling all the required portions of the seam causing unsoldered spaces or spots within the seam which impair the strength and hermetic quality thereof. Because of its many superior features the lock and lap type of side seam is employed almost exclusively in the manufacture of cans. It is this type of seam which is illustrated in the present application and to which the principle off my invention is especially applicable.

The main object of my invention is to overcome this difficulty and to provide a method for producing an improved side seam by creating air spaces or vents therein for the escape of air during subsequent operations, especially the soldering operation.

Another purpose of my invention is to overcome the difficulty mentioned without changing the standard blank of the can body prior to the application of my invention and without altering the sequence or number of operations upon the blank or upon the partially formed can body.

Another object of my invention is the provision of a mechanism at one of the operating stations of a modern can body making machine, preferably a simple spline device at the bumping station, which will produce air vents in the side seam for the escape of air during the subsequent soldering operation.

Numerous other objects and advantages of the invention will be apparent as it is better understood from the following description, which, taken in connection with the accompanying drawing, discloses a preferred embodiment thereof.

Referring to the drawing:

Figure 1 is a diagrammatic fragmentary elevation illustrating so much of the mechanism at the bumping station of a body maker as is necessary to an understanding of the present invention. This view also illustrates in dotted lines the relative position of the spline mechanism of my invention;

Fig. 2 is a bottom plan view of my improved spline;

Fig. 3 is a side elevation of the spline disclosed in Fig. 2;

Fig. 4 is a fragmentary perspective view illustrating a can body blank formed with standard hook and lap portions;

Fig. 5 is a vertical section through a longitudinal center of a can body seam after the can body has been operated upon at the bumping station;

Fig. 6 is a cross sectional detail of the side seam as it would look if viewed along the line 6—6 of Fig. 5, showing the side seam completely closed, and Fig. 7 is a similar cross sectional detail of the side seam as it would look if viewed along the line 7—7 of Fig. 5, showing the folds of the seams sufficiently separated to permit air to pass around the hooked edges of the container body.

As is well known in the art of can making, the main steps or operations in a modern can bodymaker are as follows: Feeding the can body blank from a stack; notching the blank; bending the blank around a forming mechanism into a partially formed can body; edging or hooking the can body blank; interengaging the hooked edges to produce a partially formed side seam of the lock and lap seam type; bumping the side seam to final form, and finally soldering the side seam. I have applied the principle of my invention to the bumping operation.

To illustrate a preferred embodiment of my invention, I have shown diagrammatically in Fig. 1 of the drawing a part of a modern can bodymaker which is located next to the side seam soldering unit and is customarily called the bumping station. It comprises a frame part 11 having a bolt connection 12 and supporting a standard cylindrical expanding horn or mandrel 15, the function of which is to movably support a partially formed can body 16. The horn or mandrel 15 is provided with a longitudinal feed slot 17 in which a reciprocating feeding device (not shown) of any preferred construction is movable for propelling can bodies forward. Reference numeral 18 indicates the spline mechanism of my invention which forms the lower central part of the horn section 15 and is removably secured therein approximately along the dotted line 19.

A standard bumping mechanism is shown fragmentally in vertical alignment with the spline mechanism 18. This bumping mechanism is part of the bodymaking machine and need not be described in detail for a clear understanding of the present invention. Briefly, it comprises a supporting base 20 carrying a bumping hammer or die 21 adjustably secured to the base by bolt and nut connections 22. When suitably connected with the bodymaker, it is actuated by power supplied to the bodymaker to vertically reciprocate and strike with its hammer or die 21 against the properly aligned can body 16 and the spline or anvil 18 in the mandrel 15.

The container body 16 shown upon the mandrel or horn section 15 is made out of a flat blank of sheet metal, the edges of which are formed to produce a lock and lap seam type of side seam well known in the art. This type of seam is produced, as clearly illustrated in Fig. 4, by notching the blank, as indicated at 23 and 24, and bending the central portion of the abutting edges of the blank into hook form, as shown at 25 and 26, which leaves lap portions 27 on the unnotched edge of the blank. The hooked edges 25 and 26 are then interengaged while the can body is upon the expanding horn section 15 to form a loose side seam of the lock and lap seam type.

In timed relation with the presentation of a partially formed can body at the bumping station, the bumping mechanism is reciprocated and the bumping hammer or die 21 strikes upwardly against the can body 16 properly positioned on the expanding horn or mandrel 15. The can body 16 is properly positioned when the side seam on the interior of the container is in exact vertical alignment with the longitudinal center of the spline or anvil 18, the latter in turn being in exact vertical alignment with the hammer 21 of the bumping mechanism.

Prior to my invention, this upward striking of the bumping hammer 21 caused the interengaged hooks 25 and 26 to be bumped or compressed to the tightly closed condition of the seam shown in Fig. 6. This old way of bumping left no air vents in the side seam for the escape of trapped air during the subsequent soldering operation and caused the difficulty heretofore referred to.

To overcome these difficulties, I developed my improved spline or anvil mechanism 18. This mechanism comprises a substantially rectangular spline body of tool steel having one edge beveled at 28. The body is provided with a standard rectangular channel or recess 29 substantially along the longitudinal center of the body and is defined by two solid rectangular side wall portions 30. The depth of the longitudinal channel 29 is equal to the thickness of the three layers of sheet metal comprising the inner part of the compressed double seam shown in Fig. 6, and of a width equal to the width of the same double seam lying within the can body 16. The length of the channel 29 from "A" to "B" of Fig. 2 is exactly the length of the lock part of the side seam of the container 16. It will be readily seen from this description that the function of the channel 29 is to receive, guide and align the side seam on the inside of the can body 16 during the bumping operation. The bottom of the channel 29 between the points A—B is provided with a series of recesses 31 of substantially rectangular configuration and spaced apart from each other by intervening bridge members 32 which are undisturbed portions of the bottom of the channel 29 and the surfaces of which are on an even plane with the plane of the surface of the bottom of the recess 29.

The spline is further provided with transverse blocks 33 known in the art as chips adjacent the points A and B and substantially triangular die parts 34 rise from said chips 33 for engaging and pressing the lap portions 27 of the side seam into proper relationship. The faces of the die parts 34 are on an even level with the surfaces of the parts 30 of the spline. As already briefly mentioned, the whole spline 18 is adapted to be removably inserted longitudinally of the expanding horn 15 and centrally of the bottom part of the horn 15 so as to be in exact vertical alinement not only with the side seam on the inside of the can body 16 but also in exact vertical alinement with the bumping hammer 21 so that the bottom of the spline, shown in Fig. 2, faces the top surface of the bumping hammer 21 with the can body 16 therebetween. The spline body 18 is substantially rectangular in outline and a slot of like configuration is provided in the mandrel 15, approximately along the dotted line 19, shown in Fig. 1. The spline 18 is secured to the mandrel 15 by means of a drive fit, i. e. the horn 15 is slotted or channeled longitudinally along the line 19 to receive the spline body, the receiving slot being slightly less in dimension than the spline so that the spline, once driven home, will fit tightly within the slot, but may be removed by substantially the same driving force which was needed to insert the same.

Referring now to Figs. 1, 5, 6 and 7, it will be readily seen that when the can body 16 has reached the bumping station (shown in Fig. 1) in its travel through the bodymaker machine and has come to a temporary dwell at the bumping station sufficiently long for the performance of the bumping operation, the bumping mechanism in timed relation with the feeding mechanism (not shown) reciprocates and the bumping hammer 21 strikes upwardly against the properly aligned can body 16, or more specifically against the outside of the side seam, the inner part of the side seam being in exact alignment with the recess 29 of the spline or anvil 18 with the result that by this striking or bumping action, the whole length of the seam is pressed together (as shown in Fig. 5) with alternate portions 32' tightly pressed together (as shown in Fig. 6) and alternate portions 31' loosely pressed together (as shown in Fig. 7).

It will be readily apparent that the alternate portions 32' of the lock part of the side seam are compressed more closely than the portions 31' because these portions of the side seam come to lie between and are compressed by the hammer 21, and the bridge portions 32 of the spline and the alternate portions 31' are compressed less closely than the portions 32' because these portions of the side seam come to lie between and are compressed by the hammer 21 and the recessed portions 31 of the spline, which parts 21 and 31 are a greater distance apart from each other than the parts 21 and 32. The loosely compressed portions 31' thus leave continuous channels 35 extending into the interior of the can body through which air may escape during the soldering operation. After the side seam has been thus mechanically treated at the bumping station, the can body is fed forward to the soldering mechanism where molten solder is applied against the outside of the side seam in the usual or preferred manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A method of forming side seams in can bodies, which consists in bending and loosely interengaging and hooking together the edges of a can body blank to provide a can body with a partially formed side seam and then bumping said side seam to provide air vents in the seamed area for the escape of the air during the subsequent soldering operation.

2. A method of forming side seams in can bodies, which consists in bending and loosely interengaging and hooking together the edges of a can body blank to provide a can body with a partially formed side seam and then bumping said side seam to provide air vents in the seamed area for the escape of the air from the seam when molten solder is applied externally to the same and flows into the seam.

3. The method of forming lock and lap seams on can bodies, which consists in loosely interengaging the hooked portions of the blanks to provide a can body with a partially formed side seam and then bumping said side seam to provide air vents in the locked seam area for the escape of the air during the subsequent soldering operation.

4. The method of forming side seams in can bodies which consists in loosely interengaging the edges of a can body blank in hooked relation to provide a can body with a partially formed side seam and then pressing said edges in greater and lesser degree at spaced intervals to provide air vents at the location of pressure of lesser degree.

5. The method of forming side seams in can bodies which consists in loosely interengaging the edges of a can body blank in hooked relation to provide a can body with a partially formed side seam and then pressing said edges alternately in greater and lesser degree at spaced intervals to provide air vents at the location of pressure of lesser degree for the escape of air during the subsequent soldering operation.

6. A lock and lap side seam for a container body which consists of interengaged hooked edges, and overlapped parts at the ends of the body, said edges being pressed together in greater and lesser degree at spaced intervals.

7. A lock and lap side seam for a container body which consists of interengaged hooked edges to form the lock part of the seam and overlapped edge parts to form the lap part of the seam, said lock part of the seam being pressed together alternately in greater and lesser degree at spaced intervals to form tightly contacting portions and alternating loosely arranged portions to provide air vents at the location of pressure of lesser degree.

8. A mechanism in a can body making machine for providing vented side seams, comprising a spline die removably connected with the body making machine at the bumping station and a bumping hammer cooperating with said die to produce a lock and lap side seam with tightly closed portions and loosely arranged portions, the latter including air vents for the escape of air during the subsequent soldering operation.

9. A mechanism in a can body making machine for providing vented side seams, comprising a spline die removably connected with the can body supporting horn of the body making machine at the bumping station and in vertical alignment with the bumping hammer, said spline having a channel for the reception of the side seam on the interior of the container body and raised and lowered die parts within said channel to produce in cooperation with said bumping hammer a lock and lap side seam having tightly closed portions and loosely arranged vented portions for the escape of the air during the subsequent soldering operation.

10. A bodymaker spline having a longitudinal recess for the reception of a lock and lap side seam on the interior of a can body and die parts within said recess to produce a side seam having alternate fully closed portions and alternate partially closed portions, the latter having air vents.

11. A mechanism in a can body making machine for providing vented side seams, comprising a die for producing tightly closed and loosely arranged portions of a side seam, the latter portions including air vents for the escape of air during the subsequent soldering operation, said die having transversely arranged and spaced apart bridge-members arranged in a channel between side walls.

12. A mechanism in a can body making machine for providing vented side seams, comprising a die having upon its face raised bridge members arranged in a channel between side walls for producing tightly closed portions of a side seam and spaces between said bridge members for producing loosely arranged portions of said seam, the latter portions including air vents for the escape of air during the subsequent soldering operation.

WALTER R. MEYERS.